(12) United States Patent
Wears

(10) Patent No.: US 8,967,187 B2
(45) Date of Patent: Mar. 3, 2015

(54) CONTROL VALVE PRESSURE BLEED INSPECTION PORT

(75) Inventor: William E. Wears, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 115 days.

(21) Appl. No.: 13/117,057

(22) Filed: May 26, 2011

(65) Prior Publication Data
US 2011/0291039 A1 Dec. 1, 2011

Related U.S. Application Data

(60) Provisional application No. 61/349,592, filed on May 28, 2010.

(51) Int. Cl.
F16K 51/00 (2006.01)
F16K 31/126 (2006.01)
F16K 24/02 (2006.01)

(52) U.S. Cl.
CPC .............. F16K 31/1262 (2013.01); F16K 24/02 (2013.01)
USPC .................................................... 137/315.28

(58) Field of Classification Search
USPC ............... 137/15.18, 315.27, 315.28, 315.29; 251/61.4, 61.5, 63.5, 63.6, 128
See application file for complete search history.

(56) References Cited

U.S. PATENT DOCUMENTS

| 828,680 | A | * | 8/1906 | Quick | 166/53 |
| 3,129,603 | A | * | 4/1964 | Natho | 74/89.45 |
| 3,456,679 | A | | 7/1969 | Graham | |
| 3,656,501 | A | * | 4/1972 | Buchta | 137/315.29 |
| 4,270,727 | A | * | 6/1981 | Norman | 251/63.4 |
| 4,384,724 | A | * | 5/1983 | Derman | 277/431 |
| 4,451,047 | A | * | 5/1984 | Herd et al. | 277/539 |
| 4,773,440 | A | * | 9/1988 | Yanagawa et al. | 137/242 |
| 5,078,175 | A | * | 1/1992 | Martin et al. | 137/242 |
| 5,372,352 | A | * | 12/1994 | Smith et al. | 251/214 |

(Continued)

FOREIGN PATENT DOCUMENTS

DE 27 15 600 A1 10/1978
EP 1 722 141 A2 11/2006

OTHER PUBLICATIONS

Search Report for PCT/US2011/037971, mailed Sep. 7, 2011.

(Continued)

Primary Examiner — John K Fristoe, Jr.
Assistant Examiner — Jonathan Waddy
(74) Attorney, Agent, or Firm — Marshall, Gerstein & Borun LLP

(57) ABSTRACT

A valve with an integral bleed passage includes a valve body including a threaded bore, a bonnet having a first threaded portion arranged to be securable to the bore of the valve body and having a second portion disposed outside the valve body, and a cavity defined between the valve body and the first portion of the threaded bonnet. A bleed passage is formed in the bonnet and includes an entrance aperture formed in the first portion of the bonnet and in flow communication with the cavity, the passage including an exit aperture formed in the second portion of the bonnet, and a main portion providing flow communication between the entrance aperture and the exit aperture. The cavity and the entrance aperture are positioned to expose the passage to an interior portion of the valve prior to removal of the bonnet from engagement with the valve body.

7 Claims, 3 Drawing Sheets

(56) References Cited

U.S. PATENT DOCUMENTS

| | | | | |
|---|---|---|---|---|
| 5,673,919 A | * | 10/1997 | Muller | 277/320 |
| 5,732,731 A | * | 3/1998 | Wafer | 137/312 |
| 6,401,747 B1 | * | 6/2002 | Cain et al. | 137/329.03 |
| 6,695,000 B2 | * | 2/2004 | Hall et al. | 137/312 |
| 7,467,811 B2 | * | 12/2008 | Frasch et al. | 285/13 |

OTHER PUBLICATIONS

Written Opinion for PCT/US2011/037971, mailed Sep. 7, 2011.
Office Action for Chinese Patent Application No. 201180001587.2, mailed Dec. 24, 2013.

* cited by examiner

CONTROL VALVE PRESSURE BLEED INSPECTION PORT

FIELD OF THE INVENTION

The present invention relates generally to control valves and, more specifically, to control valves having bleed inspection ports that allow the detection of failure conditions, such as the loss of integrity of sealed threaded joints within the valve, and that allow the release of internal pressure build-up within the control valve prior to disassembly of the control valve.

DESCRIPTION OF THE PRIOR ART

Notwithstanding the myriad of valves available for controlling the flow of fluid into or through a system, control valves have heretofore suffered from an inability (or poor ability) to indicate when there has been a loss of integrity of seals within the control valve. When a seal within a control valve fails, unless detected early, the resulting pressure loss in the system could lead to costly, and even dangerous consequences, particularly when highly flammable fluids are being passed through the control valve. Another potential shortcoming of existing control valves has been the inability to detect the presence of internal pressure within the valve during or prior to disassembly. If the internal pressure of the control valve is not released in a safe, controlled manner, the bonnet of the control valve could prematurely dislodge from the control valve, or an uncontrolled amount of fluid within or passing through the control valve could suddenly be released. Consequently, protocols have been developed for isolating and bleeding pressure out of control valves prior to disassembly.

More recently, controls valves have been developed with integral bleed ports or inspection ports formed through the valve body. One such example can be found in commonly assigned U.S. Pat. No. 6,695,000, the entire disclosure of which is incorporated by reference herein.

SUMMARY

In accordance with one or more exemplary aspects, a control valve assembled in accordance with the teachings disclosed herein includes a valve body including a threaded bore, a bonnet, with the bonnet having a first threaded portion arranged to be threadedly securable to the threaded bore of the valve body, the bonnet further having a second portion disposed outside the valve body, a cavity defined between the valve body and the first portion of the threaded bonnet, and a passage formed in the bonnet. The passage includes an entrance aperture formed in the first portion of the bonnet, with the entrance aperture in flow communication with the cavity, the passage further including an exit aperture formed in the second portion of the bonnet, and including a main portion providing flow communication between the entrance aperture and the exit aperture.

In accordance with one or more exemplary aspects, the entrance aperture and the cavity are positioned relative to one another such that the entrance aperture and hence the passage are exposed to interior pressure within the valve prior to removal of the bonnet from threaded engagement with the valve body.

In further accordance with one or more exemplary aspects, the bonnet includes an outer surface, and the main portion of the passage is spaced inwardly from the outer surface. The passage may include a first connecting portion providing flow communication between the entrance aperture and the main portion of the passage, and may also include a second connecting portion providing flow communication between the exit aperture and the main portion of the passage. Still further, the second portion of the bonnet may include a widened section having an outer surface, with the exit aperture formed in the outer surface, and with the second connecting portion comprising a bore.

Still further, the second portion of the bonnet may include a widened section having a top surface, with the second connecting portion comprising a groove formed in the top surface, and with an end portion of the groove forming the exit aperture. The valve body may include an annular groove, and at least a portion of the cavity may be defined by the annular groove. A seal may be disposed between the bonnet and the valve body, with the seal forming a sealed engagement between the bonnet and an interior wall of the valve body. The seal may be spaced away from the entrance aperture, and the bonnet may include an annular groove, with the seal is disposed in the annular groove of the bonnet.

In accordance with a further aspect, a valve with an integral bleed passage includes a valve body including a threaded bore, a bonnet having a first threaded portion arranged to be securable to the bore of the valve body and having a second portion disposed outside the valve body, and a cavity defined between the valve body and the first portion of the threaded bonnet. A bleed passage is formed in the bonnet and includes an entrance aperture formed in the first portion of the bonnet and in flow communication with the cavity, the passage including an exit aperture formed in the second portion of the bonnet, and a main portion providing flow communication between the entrance aperture and the exit aperture. The cavity and the entrance aperture are positioned to expose the passage to an interior portion of the valve prior to removal of the bonnet from engagement with the valve body A control valve constructed in accordance with one or more of the exemplary forms discussed herein may provide early detection of leakage in the seals within a control valve or in the bonnet of the control valve. In accordance with the exemplary embodiments, the passage through the bonnet of the control valve provides, for example, a pressure bleed port or passage. The bonnet of the control valve is removably secured to the body of the control valve by the threaded interface. There is a seal between the bonnet and the interior wall of the body, in the immediate vicinity of the entrance aperture of the passage or pressure bleed port. When there is an adequate pressure seal within the control valve, i.e. when there is no leakage present, none of the fluid whose flow rate is moderated by the control valve should be detected at the pressure bleed opening formed by the exit aperture.

However, when there is a leaking seal within the control valve, the pressure differential between the atmosphere and the interior of the control valve has the potential to cause some of the fluid in the control valve to leak out of the control valve through the pressure bleed bore or exit aperture. The fluid exiting through the exit aperture can then easily be detected, allowing a technician to observe the fluid and thereby determine the existence of a seal failure between the body and the bonnet of the control valve.

Another useful purpose served by the more form exemplary aspects discussed herein is that the bleed passage allows for the release of internal pressure within the control valve prior to disengaging the threaded connection between the bonnet and the valve body. If the internal pressure builds up between the bonnet and valve body, the internal pressure needs to be relieved prior to disassembly. The arrangement of the entrance aperture of the passage in conjunction with the location and size of the cavity exposes the interior of the control valve to the atmosphere as soon as the bonnet is unthreaded to a point at which it loses its seal with the valve body. At that point, the internal pressure of the control valve is released through the passage (i.e., the inlet or outlet passageway of the control valve) immediately adjacent to the interior end, or second end, of the bleed bore, and travels through the bleed bore to the atmosphere, thereby equalizing with atmospheric pressure. Advantageously, the internal pressure is released prior to the bonnet being completely disengaged from its threaded connection with the body of the control valve.

DETAILED DESCRIPTION OF AN EXEMPLARY EMBODIMENT

Figure 1:
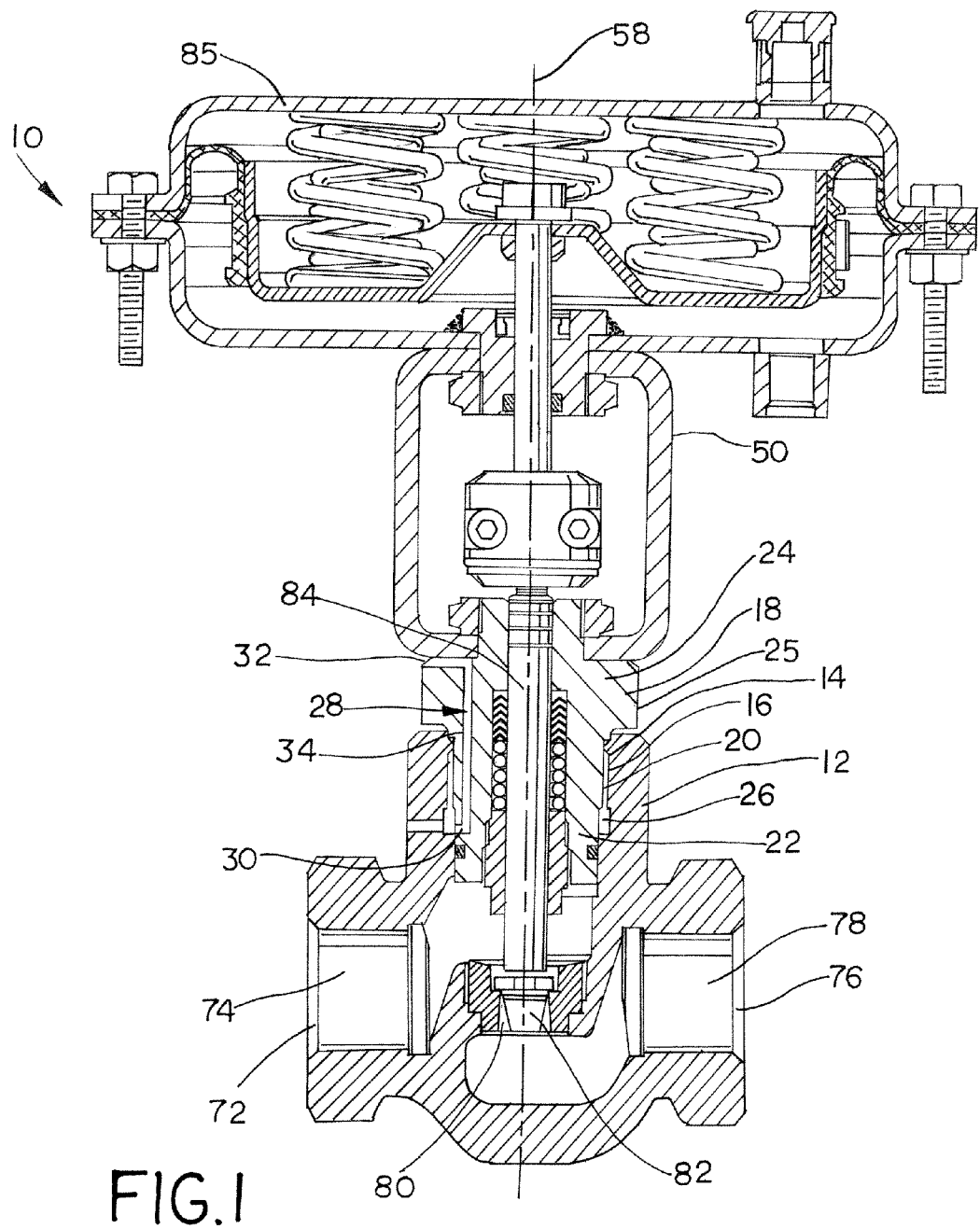
FIG. 1 is a cross-sectional view of a control valve assembled in accordance with the teachings of a first disclosed example of the present invention and having a valve body, a threaded bonnet connected to the valve body, and a pressure bleed port through the bonnet.
Figure 2:
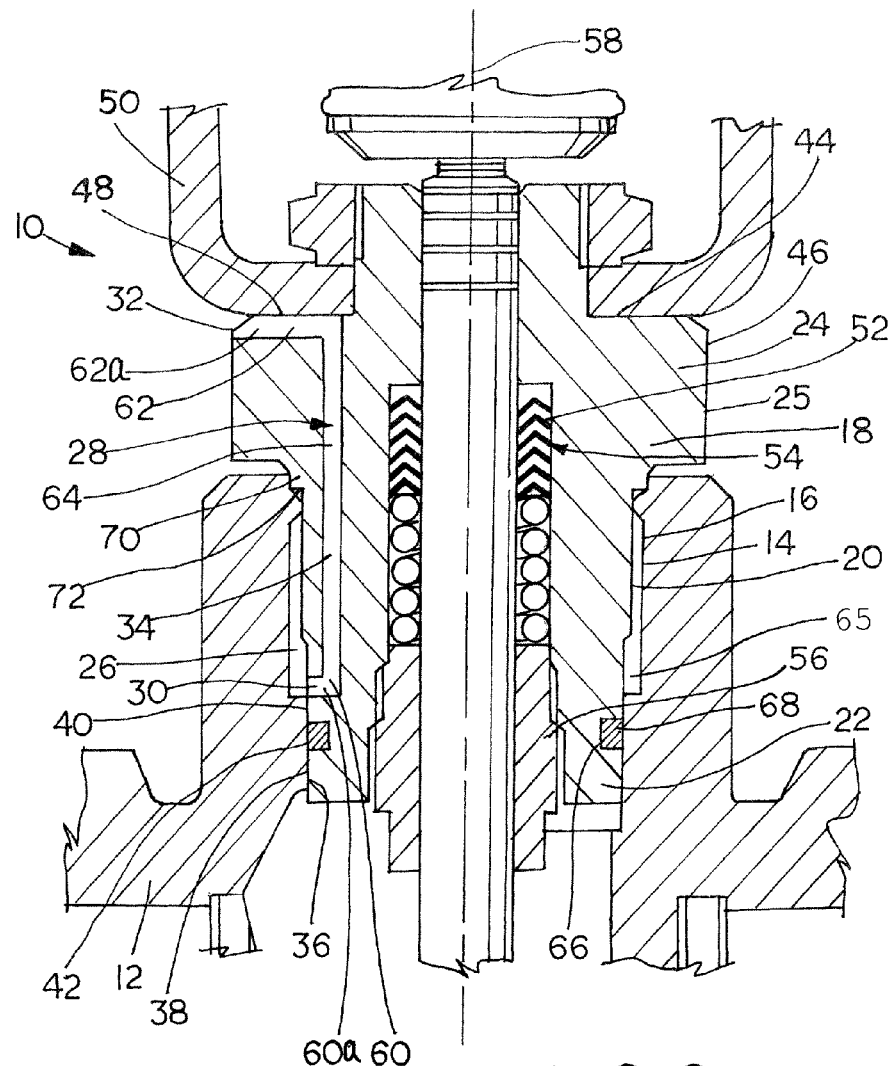
FIG. 2 is enlarged fragmentary cross-sectional view of the control valve of FIG. 1.

Referring now to the drawings, FIGS. 1 and 2 show a control valve 10 assembled in accordance with the teachings of a first disclosed example of the present invention. The control valve 10 includes a valve body 12 having a bore 14 provided with internal threads 16, and also includes a bonnet 18 provided with external threads 20. Consequently, the bonnet 18 can be secured within the bore 14 of the valve body 12 by mating the threads 20 of the bonnet 18 to the threads 16 of the bore 14. The bonnet 18 includes a first portion 22 and a second portion 24. The threads 20 are carried by the first portion 22 of the bonnet 18, and the second portion 24 extends beyond the bore 14 so as to protrude from or extend outside of the valve body 12. In the example shown, the second portion 24 includes a widened portion 25 which has a larger diameter than a diameter of the first portion 22 of the bonnet 18. A cavity 26 is formed or otherwise defined between the valve body 12 and the first portion 22 of the bonnet 18 (although the cavity 26 is visible in FIG. 1, the enlarged view of FIG. 2 shows the cavity 26 more clearly). A passage 28 is formed in the bonnet 18, with the passage 28 including an entrance aperture 30 and an exit aperture 32 (the entrance aperture 30 is more clearly visible in FIG. 2). In the example shown, the entrance aperture 30 is formed in the first portion 22 of the bonnet 18, while the exit aperture 32 is formed in the second portion 24 of the bonnet 18. Preferably, the exit aperture 32 carried by the second portion 24 of the bonnet 18 is formed in the widened portion 25. The entrance aperture 30 is positioned within the bore 14 of the valve body 12 so as to be in flow communication with the cavity 26 when the bonnet 18 is fully threaded into the bore 14 of the valve body 12. Further, a main portion 34 of the passage 28 provides flow communication between the entrance aperture 30 and the exit aperture 32.

Referring to FIG. 2, the first portion 22 of the bonnet 18 includes an inner end 36 which is disposed inside the valve body 12, and also includes a radially outer surface 38 which is disposed along an interface 40 between the first portion 22 of the bonnet 18 and an interior surface 42 of the bore 14. The threads 20 of the bonnet 18 as well as the cavity 26 are disposed along the interface 40. The second portion 24 of the bonnet 18 includes an upper surface 44 and an outer surface 46. In the example of FIG. 2, the upper surface 44 abuts and adjacent portion 48 of a yoke 50. The bonnet 18 includes a central bore 52 which houses a packing assembly 54 and a packing nut 56.

As shown in FIG. 2, the main portion 34 of the passage 28 is preferably spaced radially inward from the outer surface 38 of the bonnet 18. Still preferably, the main portion 34 of the passage 28 may be oriented parallel or generally parallel relative to an axis 58 of the valve stem and the bore 52 through the bonnet 18. The passage 28 includes a first connecting portion 60 which is formed in a first portion 22 of the bonnet 18 and which provides flow communication between the entrance aperture 30 and the main portion 34 of the passage 28. The passage 28 also includes a second connecting portion 62 which is formed in a second portion 24 of the bonnet 18 and which provides flow communication between the exit aperture 32 and the main portion 34 of the passage 28.

In the example shown in FIG. 2, the main portion 34 of the passage 28 takes the form of a bore 64 drilled or otherwise formed in the bonnet 18 and oriented parallel to the bore 52 of the bonnet 18, and the first connecting portion 60 also takes take the form of a bore 60a. The second connecting portion 62 takes the form of a groove 62a formed in the upper surface 44 of the second portion 24 of the bonnet 18. Preferably, the bore 60a and the groove 62a are oriented perpendicular or generally perpendicular relative to the vertically oriented bore 64. Consequently, the bore 60a and the groove 62a preferably extend in a generally radial direction from the bore 64 of the bonnet 18 toward the outer surface of the bonnet 18. The bore 64 in the bonnet 18 may be formed by drilling the bore 64 from above, such as through the upper surface 44 of the second portion 24 of the bonnet 18. The bore 60a may be formed by drilling the bore from the outer surface of the first portion 22 of the bonnet 18, so as to intersect with the bore 64. Finally, the groove 62a may be formed in a suitable fashion in the upper surface 44 of the bonnet 18 so as to intersect with the bore 64. The exit aperture 32, and hence the groove 62a, extends to the outer surface 46 of the second portion 24 of the bonnet 18. Preferably, the upper surface 44 of the second portion 24 of the bonnet 18 may abut the adjacent portion 48 of the yoke 50 so as to allow the groove 62a to effectively function as a bore.

Referring still to FIG. 2, the bore 14 of the valve body 12 includes an annular groove 65. The annular groove 65 preferably is positioned below the cooperating threads 16 and 20, and the annular groove 65 cooperates with the adjacent outer surface of the bonnet 18 to form the cavity 26. Alternatively, the outer surface of the bonnet 18 could include an annular groove that cooperates with the illustrated annular groove 65 to form the cavity 26. As a still further alternative, both the valve body and the bonnet could include cooperating annular grooves to form the cavity 26. The bonnet 18 preferably includes an annular groove 66 disposed below the cavity 26, with the annular groove 66 sized to receive a seal 68, which may take the form of an O-ring, a gasket, or any other suitable seal in order to form a seal of engagement between the bonnet and the interior wall of the valve body. Preferably, the groove 66 and hence the seal 68 are spaced a first distance downwardly from the entrance aperture 30.

Referring again to FIG. 1, it will be understood that other aspects of the control valve 10 may be conventional. Therefore those of skill in the art will understand that the control valve 10 also includes an inlet 72 including an inlet passage 74, an outlet 76 including an outlet passage 78, and a control passage 80 providing flow communication between the inlet passage 74 and the outlet passage 78, depending on the position of a shiftable control element which, in the disclosed example, is a valve plug 82. The valve plug 82 is connected to a shiftable valve stem 84 which, in the disclosed example, is a linear or sliding stem. Those of skill in the art will understand that the valve stem 84 is operatively coupled to an actuator 85, which may be any suitable actuator.

As an alternative, the fluid inlet passage and the fluid outlet passage may be reversed from the arrangement shown, such that the fluid inlet passage becomes the fluid outlet passage, and the fluid outlet passage becomes the fluid inlet passage, thereby changing a downward flow valve to an upward flow valve. As a further alternative, the fluid inlet passage and the fluid outlet passage may be at the same height as one another.

As shown in FIG. 2, when fully assembled, the bonnet 18 is preferably completely threadedly received in the bore 14 of the valve body 12, such that a portion 70 of the bonnet 18 abuts a portion 72 of the valve body 12. An additional seal or gasket may be provided at an interface between the portions 70 and 72. Also, when fully assembled, the seal 68 is in sealed contact with both the bonnet 18 and the valve body 12. The entrance aperture 30 of the passage 28 is preferably positioned such that the entrance aperture 30 is in flow communication with the cavity 26.

Figure 3:
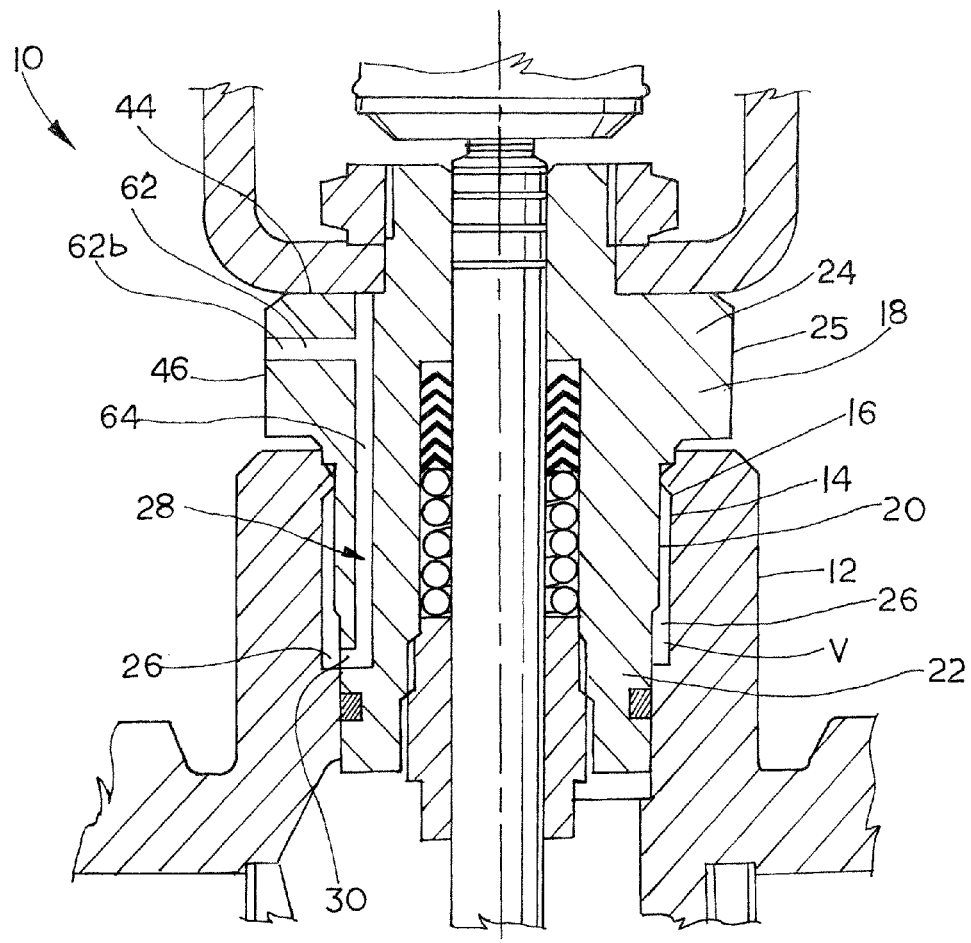
FIG. 3 is enlarged fragmentary cross-sectional view of a control valve assembled in accordance with the teachings of another disclosed example of the present invention and also having a valve body, a threaded bonnet connected to the valve body, and a second form of a pressure bleed port through the valve bonnet.

Referring now to FIG. 3, the control valve 10 is shown having an alternate form for the exit capture 32 of the passage 28. For the sake of brevity, only the differences between the example of FIGS. 1 and 2 one the one hand, and the example of FIG. 3 on the other hand, will be discussed herein. Those of skill in the art, upon reading the foregoing description, will readily understand that all of the remaining components discussed above with respect to FIGS. 1 and 2 may be the same or substantially similar except as explicitly described as alternate forms herein. In the example of FIG. 3, the connecting portion 62 leading to the exit aperture 32 takes the form of a bore 62b. The bore 62b is formed in the upper or second portion 24 of the bonnet 18, and extends through the widened portion 25 to the outer surface 46. In the example shown, the bore 62b again is oriented perpendicular or generally perpendicular relative to the vertically oriented bore 64. Consequently, the bore 62b preferably extends in a generally radial direction from the bore 64 of the bonnet 18 toward the outer surface 46 of the widened portion 25 of the bonnet 18. The bore 64 in the bonnet 18 may again be formed by drilling the bore 64 from above, such as through the upper surface 44 of the second portion 24 of the bonnet 18, and the bore 62b may be formed by drilling the bore from the outer surface 46 of the second portion 24 of the bonnet 18, which may be in a radial or substantially radial direction, so as to intersect with the bore 64. Thus, the exit aperture 32 extends to the outer surface 46 of the second portion 24 of the bonnet 18.

In accordance with the disclosed forms, the entrance aperture 30 is placed a known distance from the seal 68 residing in the groove 66. Further, the cavity 26 has a vertical dimension V. Consequently, when the bonnet 18 begins to be unthreaded for removal, the entrance aperture 30 will remain in flow communication with the cavity 26 long enough for any built up internal pressure to begin to escape past the seal 68. That is, when the bonnet 18 is unthreaded, for at least a portion of the travel of the bonnet 18 upwardly within the bore 14, the entrance aperture 30 (and hence the passage 28) and a leak path formed at the interface 40 past the seal 68 will both be in flow communication with the cavity 26.

In both of the foregoing examples, the exit aperture 32 may be plugged with a cover, such as a cap, plug, or other suitable seal if desired. Further, the exit aperture 32 of the passage 28 may be provided with some sort of indicating means, such as a transparent or translucent cover (not shown), or a sensor that senses the presence of the process fluid or medium. Such an indicating means could be actuated, for example, upon release of internal pressure through the passage 28, which would then be visible to a technician or other maintenance person. This indicating means would show a person disassembling the bonnet from the control valve that the internal pressure had not previously been bled from the control valve prior to disassembly.

Further, the foregoing control valve 10 may control the flow of numerous mediums including, for example, fluids such as oil, water mixed with debris, or gas. Those of skill in the art will also understand that these examples are merely illustrative and the control valve 10 can be used for a wide variety of fluids, all examples of which are too numerous to list herein. When the fluids pass through the outlet passage of the control valve 10, the seal 68 between the bonnet 18 and the entrance aperture 30 of the passage 28 prevents the fluids from leaking through the passage 28 of the pressure bleed indicator. If, however, in the event of a failure in the seal 68, or in the event of the seal somewhere else between the bonnet 18 and the valve body 12, fluids would find their way to the cavity 26, from where they would be communicated to the exit aperture 32 via the passage 28.

As control valves 10 of the type disclosed herein are frequently used, by way of example only, as dump valves for carrying away highly visible fluids containing hydrocarbons, and other waste fluids, during oil purification, as well as for many other applications involving flow control of fluids, both related and unrelated to oil purification, any fluids leaking out the pressure bleed indicator would advantageously be detectable, and if in liquid form, readily visible to passersby from outside the valve body 12. Thus, those of skill in the art will understand that the passage 28 functions as a pressure bleed indicator.

For both of the foregoing examples, in the event the control valve 10 has not properly isolated and bled of its internal pressure prior to disassembly, the above-described examples provides a means or method by which any built-up internal pressure is equalized with atmospheric pressure before the bonnet 18 is completely disengaged from the valve body 12. Also, while removing the bonnet 18 while there is internal pressure in the control valve higher than atmospheric pressure, the passage 28 may provide an audible and/or visual indicator of elevated internal pressure within the control valve 10. If such elevated internal pressure is detected, a technician has an opportunity to re-tighten the bonnet 18 and properly bleed pressure from the control valve 10 using other means or techniques.

In a conventional valve, if the internal pressure is not released prior to disassembling the bonnet from the valve body, the bonnet and any fluid in the interior cavity of the valve may undesirably fly or eject from the valve body in an uncontrolled manner during disassembly. The control valve 10 described herein substantially reduces the likelihood of this potentially dangerous situation.

In one or more of the foregoing examples, the description uses terms such as upper, lower, inwardly and/or outwardly. These terms are relative only and are to be used in the context of describing the exemplary embodiments when positioned as shown in the Figures. Those of skill in the art will readily understand that valves may be positioned in different orientations than those shown in the Figures, and those of skill in the art can readily understand how to adapt these relative terms to alternate orientations of the subject control valves.

While the control valve pressure bleed port has been described with respect to certain embodiments thereof, it will be understood by persons of ordinary skill in the art that the appended claims are not intended to be limited thereto, and that modifications can be made that are considered within the scope of the claims.

What is claimed:

1. A valve comprising:
   a valve body including a threaded bore;
   a bonnet, the bonnet having a first threaded portion arranged to be threadedly securable to the threaded bore of the valve body, the bonnet further having a second portion disposed outside the valve body;
   a cavity defined between the valve body and the first portion of the threaded bonnet; and
   a passage formed in the bonnet, the passage including an entrance aperture formed in the first portion of the bonnet, the entrance aperture in flow communication with the cavity, the passage including an exit aperture formed in the second portion of the bonnet, and a main portion providing flow communication between the entrance aperture and the exit aperture;
   wherein the bonnet includes an outer surface, and wherein the main portion of the passage is spaced inwardly from the outer surface;
   wherein the passage includes a first connecting portion providing flow communication between the entrance aperture and the main portion of the passage;
   wherein the passage includes a second connecting portion providing flow communication between the exit aperture and the main portion of the passage; and
   wherein the second portion of the bonnet includes a widened section having a top surface, and wherein the second connecting portion comprises a groove formed in the top surface, and wherein an end portion of the groove forms the exit aperture.

2. The valve of claim 1, wherein the valve body includes an annular groove, and wherein at least a portion of the cavity is defined by the annular groove.

3. The valve of claim 2, including a seal disposed between the bonnet and the valve body, the seal forming a sealed engagement between the bonnet and an interior wall of the valve body.

4. The valve of claim 3, wherein the seal is spaced away from the entrance aperture.

5. The valve of claim 4, wherein the bonnet includes an annular groove, and wherein the seal is disposed in the annular groove of the bonnet.

6. A valve comprising:
   a valve body including a threaded bore;
   a bonnet, the bonnet having a first threaded portion arranged to be threadedly securable to the threaded bore of the valve body, the bonnet further having a second portion disposed outside the valve body;
   a cavity defined between the valve body and the first portion of the threaded bonnet;
   a passage formed in the bonnet, the passage including an entrance aperture formed in the first portion of the bonnet, the entrance aperture in flow communication with the cavity, the passage including an exit aperture formed in the second portion of the bonnet, and a main portion providing flow communication between the entrance aperture and the exit aperture; and
   wherein the cavity and the entrance aperture are sized and positioned to expose the passage to a pressure level of an interior portion of the valve prior to removal of the bonnet from a threaded engagement with the valve body;
   wherein the bonnet includes an outer surface, and wherein the main portion of the passage is spaced inwardly from the outer surface, and wherein the bonnet is arranged to form a leak path past a bonnet seal upon partial removal of the bonnet from the valve body, and wherein the cavity has a vertical dimension arranged to place both the entrance aperture and the leak path in flow communication with the cavity upon partial removal of the bonnet from the valve body; and
   wherein the second portion of the bonnet includes a widened section having a top surface, and wherein the passage comprises a groove formed in the top surface, and wherein an end portion of the groove forms the exit aperture.

7. The valve of claim 6, wherein the valve body includes an annular groove, and wherein at least a portion of the cavity is defined by the annular groove.

* * * * *

UNITED STATES PATENT AND TRADEMARK OFFICE
CERTIFICATE OF CORRECTION

Page 1 of 1

PATENT NO.       : 8,967,187 B2
APPLICATION NO.  : 13/117057
DATED            : March 3, 2015
INVENTOR(S)      : William E. Wears It is certified that error appears in the above-identified patent and that said Letters Patent is hereby corrected as shown below:

In the Specification:

At Column 2, line 35, "body" should be -- body. --.

Signed and Sealed this
Twenty-third Day of February, 2016

Michelle K. Lee
*Director of the United States Patent and Trademark Office*